(12) United States Patent
Spiegel et al.

(10) Patent No.: US 6,647,711 B1
(45) Date of Patent: Nov. 18, 2003

(54) DEVICE FOR SUPPLYING EXHAUST GASES FROM AN INTERNAL COMBUSTION ENGINE TO A CATALYTIC CONVERTER

(75) Inventors: Leo Spiegel, Vaihingen/Enz (DE); Michael Zillmer, Sickte (DE); Ekkehard Pott, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/149,531

(22) PCT Filed: Nov. 22, 2000

(86) PCT No.: PCT/EP00/11617

§ 371 (c)(1),
(2), (4) Date: Jul. 9, 2002

(87) PCT Pub. No.: WO01/42632

PCT Pub. Date: Jun. 14, 2001

(30) Foreign Application Priority Data

Dec. 8, 1999 (DE) .......................... 199 59 141
Sep. 27, 2000 (DE) .......................... 100 47 815

(51) Int. Cl.⁷ .................................................. F01N 3/00
(52) U.S. Cl. ........................... 60/288; 60/298; 60/320; 60/321; 60/305; 60/292
(58) Field of Search ........................ 60/288, 289, 298, 60/320, 321, 323, 305, 307, 324, 292, 291

(56) References Cited

U.S. PATENT DOCUMENTS

| | | | | |
|---|---|---|---|---|
| 5,251,564 A | * | 10/1993 | Rim et al. .................. | 110/344 |
| 5,979,159 A | | 11/1999 | Adamczyk et al. | |
| 6,016,654 A | * | 1/2000 | Schatz .......................... | 60/291 |
| 6,250,073 B1 | * | 6/2001 | Zimmer et al. ................ | 60/281 |
| 6,276,138 B1 | * | 8/2001 | Welch .......................... | 60/602 |
| 6,564,545 B1 | * | 5/2003 | Dong ........................... | 60/289 |

FOREIGN PATENT DOCUMENTS

| | | |
|---|---|---|
| DE | 2 303 773 | 8/1974 |
| DE | 34 06 968 | 3/1985 |
| DE | 34 39 998 | 9/1985 |
| DE | 92 04 219.8 | 7/1992 |
| DE | 42 18 834 | 12/1993 |
| DE | 43 22 949 | 1/1995 |
| DE | 197 42 762 | 12/1998 |
| DE | 199 05 345 | 9/1999 |
| FR | 2 720 782 | 12/1995 |

* cited by examiner

Primary Examiner—Thomas Denion
Assistant Examiner—Binh Tran
(74) Attorney, Agent, or Firm—Ostrolenk, Faber, Gerb & Soffen, LLP

(57) ABSTRACT

A device for supplying exhaust gases from an internal combustion engine to a catalytic converter, having multiple exhaust gas supply lines including at least one exhaust gas supply line that serves as a heat-conveying line to promote a transfer of exhaust gas heat to the catalytic converter and at least one other exhaust gas supply line that serve as a heat exchanger to promote an extraction of heat from the exhaust gas upstream of the catalytic converter. A switchable control mechanism controls a flow cross-section of at least one of the exhaust gas supply lines. The exhaust gas supply lines are arranged as a bundle of pipes including individual pipes which are spaced apart and extend to the catalytic converter so that the exhaust gas supply line that is the heat-conveying line is arranged as an inner pipe in the bundle and is surrounded around its circumference by the exhaust gas supply lines that are heat exchangers, which are spaced some distance from one another in a circumferential direction of the heat conveying line. The exhaust gas supply line that is the heat-conveying line has a cross-section that is smaller than a cross-section of the exhaust gas supply line that is the heat exchanger.

18 Claims, 2 Drawing Sheets

DEVICE FOR SUPPLYING EXHAUST GASES FROM AN INTERNAL COMBUSTION ENGINE TO A CATALYTIC CONVERTER

PRIORITY CLAIM

This is a U.S. national stage of application No. PCT/EP00/11617, filed on Nov. 22, 2000. Priority is claimed on that application and on the following applications: Country: Germany, Applications No.: 199 59 141.5, filed: Dec. 08, 1999 and Country: Germany, Application No. 100 47 815.8, filed Sep. 27, 2000.

The invention concerns a device with multiple exhaust gas supply lines for supplying exhaust gases from an internal combustion engine to a catalytic converter, especially a storage catalytic converter, in accordance with the introductory clause of claim 1.

To convert nitrogen oxides contained in automotive exhaust gases from Otto engines with direct fuel injection, $NO_x$ storage catalytic converters are preferably used. However, these provide sufficiently high conversion rates only within a relatively narrow window of exhaust gas temperatures. This results in a disadvantageous limitation of the high-performance lean operating range of an Otto engine. To achieve optimum reduction of the fuel consumption of direct-injection Otto engines by lean operation, the exhaust system must be adjusted to the engine in such a way that the exhaust gas temperatures immediately before the inlet to the storage catalytic converter fall within a well-defined window of operating temperatures over the greatest possible engine operating range. The upper limit of this window of operating temperatures is reached at high vehicle speeds or high engine loads. Exceeding this upper temperature limit has a negative impact on the operation and service life (durability) of the storage catalytic converter. Therefore, to extend the lean operating range of the Otto engine, the exhaust gases must be cooled before they enter the storage catalytic converter at high vehicle speeds or high engine loads. On the other hand, it is also necessary to ensure that, after a cold start of the direct-injection Otto engine, the storage catalytic converter reaches its so-called catalytic ignition point as fast as possible, i.e., the operating temperature for optimum pollutant conversion. To this end, it is necessary to take suitable measures, which, immediately after a cold start of the Otto engine, allow the least possible removal of heat from the exhaust gases to the surrounding environment before the exhaust gases enter the catalytic converter.

DE 199 05 345 A1 describes a generic device for supplying exhaust gases from an internal combustion engine to an exhaust gas treatment system with multiple exhaust gas supply lines. Several exhaust gas supply lines are installed between a three-way catalytic converter and an $NO_x$ trap. These multiple supply lines are designed to retain a relatively large proportion of the heat in the stream of exhaust gas at relatively low exhaust gas mass flows, whereas at higher mass flows, a relatively greater proportion of the heat is eliminated with the stream of exhaust gas.

Therefore, the goal of the present invention is to specify a generic device that allows reliable adjustment of the exhaust gas temperatures at the inlet of the exhaust gases into the catalytic converter.

This goal is achieved by a device with the features specified in claim 1. This device is characterized by the fact that at least one exhaust gas supply line is designed as a heat-conveying line that promotes transfer of the exhaust gas heat to the catalytic converter, that at least one other exhaust gas supply line is designed as a heat exchanger that promotes extraction of heat from the exhaust gas upstream of the catalytic converter, and that a switchable control mechanism is provided to control a flow cross section of at least one of the exhaust gas supply lines. A device designed in this way is advantageously suited for maintaining the exhaust gas temperatures within a well-defined window of operating temperatures at the inlet of the catalytic converter for the greatest possible engine operating range (high vehicle speeds or high engine loads) as well as immediately after a cold start of the engine. This is accomplished with the use of a switchable control mechanism for controlling a flow cross section of at least one of the exhaust gas supply lines, i.e., the heat-conveying line or the heat exchanger. In this connection, the purpose of the heat-conveying line is to bring the catalyst to the catalytic ignition point as quickly as possible after a cold start of the Otto engine, while the purpose of the heat exchanger is to cool the exhaust gases upstream of the catalytic converter and thus to prevent unwanted exceeding of the upper temperature limit of the operating temperature window, especilly at high engine loads. During a cold start of the Otto engine, it is possible, for example, for the heat-conveying line to be open (maximum flow cross section) to allow maximum transfer of the heat of the exhaust gases to the catalytic converter, and for the heat exchanger to be partially or completely closed, so that as little exhaust gas heat as possible is transferred to the surrounding environment upstream of the catalytic converter and is used instead to heat the catalyst and thus to bring it to its ignition point as soon as possible after the cold start of the Otto engine. When the catalyst has reached the catalytic ignition point, and the Otto engine is being subjected to a higher load (higher vehicle speeds), it is advantageous to open the heat exchanger partially or completely and possibly to close the heat-conveying line partially or completely to prevent the upper temperature limit of the window of operating temperatures from being exceeded due to the transfer of too much heat to the catalytic converter by the exhaust gases. All of these adjustments with respect to the flow cross section of one or more exhaust gas supply lines are adapted to the given engine operating range for the purpose of controlling or regulating the amount of heat transferred to the catalytic converter by the exhaust gases and can be accomplished easily, precisely, and reliably by a switchable control mechanism.

The exhaust gas supply lines are preferably configured as pipes that are separated from one another. Since the exhaust gas supply lines are designed to have two different or opposing purposes, i.e., optimum transfer of exhaust gas heat to the catalytic converter (heat-conveying line) and minimum transfer of exhaust gas heat to the catalytic converter (heat exchanger), depending on the given engine operating range (cold start, higher engine load), it is advantageous to design the exhaust gas supply lines as separate pipes, which, preferably, are also spaced slightly apart. Separation of the heat-conveying line from the heat exchanger makes it possible to realize especially effective adjustment of the heat transfer to the catalytic converter by the exhaust gases.

In accordance with a refinement of the invention, the exhaust gas supply line that is designed as a heat-conveying line has a smaller flow cross section than the exhaust gas supply line that is designed as a heat exchanger. In this way, the surface area of heat transfer from the exhaust gas to the surrounding environment upstream of the catalytic converter can be limited to the smallest possible value with respect to the heat-conveying line and can be designed to be as large as possible with respect to the heat exchanger.

The exhaust gas supply lines are advantageously arranged as a bundle of pipes, the individual pipes of which are spaced some distance apart. The supply line that is designed as a heat-conveying line is arranged as an inner pipe in the bundle and is surrounded around its circumference by several exhaust gas supply lines that are designed as heat exchangers. Exhaust gas supply lines that are spaced some distance apart and grouped as a bundle of pipes allow a compact design of the device. In this type of arrangement, the exhaust gas supply lines that are designed as heat exchangers are preferably arranged on the outside of the bundle around the circumference of the inner heat-conveying line or lines to allow the most effective possible heat exchange between the heat exchanger and the surrounding environment.

It is advantageous for the exhaust gas supply line that is designed as the heat-conveying line to be provided with thermal insulation. The use of thermal insulation for the heat-conveying line is an especially simple and effective means of minimizing the loss of exhaust gas heat to the surrounding environment through the heat-conveying line. This ensures the best possible transfer of exhaust gas heat to the catalytic converter. This is especially advantageous during a cold start of the Otto engine, so that the catalyst heats up to the catalytic ignition point as fast as possible.

In accordance with a preferred embodiment of the invention, the exhaust gas supply line that is designed as the heat-conveying line extends into the catalytic converter to a point just upstream of the catalytic support body. This measure makes it possible to achieve rapid heating of a locally limited region of the catalytic support material, so that the temperature of the catalyst rises as fast as possible to the catalytic ignition point, at which the desired reaction of the pollutants occurs (pollutant conversion).

In a modification of the invention, the wall of the exhaust gas supply line that is designed as a heat exchanger is configured in such a way that the heat-transfer surface is increased and/or turbulence is produced in the stream of exhaust gas in the exhaust gas supply line. This serves to intensify the cooling effect of the exhaust gas supply line that is designed as a heat exchanger with respect to the gases to be supplied to the cataltyic converter. The production of exhaust gas turbulence in the heat exchanger prevents the undesirable formation of thermal stratification in the given exhaust gas supply line due to the development of a cold outer flow and a hot inner flow of the exhaust gases. It becomes more and more important to counteract this sort of thermal stratification with increasing length of the exhaust gas supply line in question (heat exchanger).

It is advantageous to provide the exhaust gas supply line that is designed as a heat exchanger with a coating that promotes heat dissipation. A coating of this type is a relatively simple means of achieving an effective increase in heat loss to the surrounding environment, especially radiational heat loss.

In accordance with a preferred embodiment of the invention, the outer surface of the exhaust gas supply line that is designed as a heat exchanger is acted on by an outside airflow that promotes heat loss. This results in an additional increase in the radiational heat loss by the heat exchanger to the surrounding environment. In this regard, a suitable configuration of the external wall of the exhaust gas supply line that is designed as a heat exchanger can produce desirable turbulence of the outside air along the wall of the pipe to produce especially effective dissipation of heat by the heat exchanger to the surrounding environment. An outside airflow of this sort can be produced, for example, by systematic guidance of the airstream through an air intake in the front end of the vehicle or the subfloor cover of the vehicle.

In accordance with a preferred embodiment of the invention, the control mechanism has a switching element that can be controlled by a control element as a function of various parameters. Parameters that may bemused to control a flow cross section of at least one of the exhaust gas supply lines are the engine coolant temperature, the exhaust gas temperature upsteam and/or downstream of the catalytic converter (with respect to the direction of exhaust gas flow), the catalytic converter temperature, and/or the exhaust gas mass flow. The purpose of using the exhaust gas mass flow as a control parameter is to avoid the development of unacceptably high exhaust gas back pressures at excessively high exhaust gas mass flows.

The switching element is advantageously designed as a rotatable disk with holes corresponding to the pipes in the bundle of pipes. A rotatable disk with holes corresponding to the supply lines is well suited for simultaneous and precise control, by proper rotation of the disk, of each flow cross section of preferably several exhaust gas supply lines as a function of various parameters. Designing the switching element in the form of a disk makes it possible to realize an especially compact device.

In accordance with a preferred embodiment of the invention, the control element is designed as a control rod actuated by an electric servomotor. A control element designed in this way allows reliable and precise control (rotation) of the switching element.

Control (rotation) of the switching element designed as a disk can be advantageously accomplished by means of a control element adapted to the specific design conditions that are present. In this connection, the control element may be designed, for example, as a vacuum box to produce precise and reliable rotation of the switching element.

In accordance with another, alternative embodiment of the invention, the control element is designed as an electromagnetic control device, which has a winding, by means of which the switching element, which acts as the armature, can be caused to rotate. A control mechanism that operates in this way has an especially compact construction and at the same time allows precise and reliable control of the flow cross section of one or more exhaust gas supply lines.

In addition, the control element may also be hydraulic in design.

The switching element can be advantageously controlled by two-position switching. With a two-position switch, the appropriate exhaust gas supply lines are completely closed or completely open, depending on present need (cold start, higher engine load), such that, if necessary, it is possible to differentiate between the exhaust gas supply line or lines that are designed as heat-conveying lines and as heat exchangers. Two-position switching is a relatively easily realized switching system for controlling the switching element.

In accordance with an alternative embodiment of the invention, the switching element can be adjusted to infinitely many intermediate positions. Continuous control of the flow cross section of the appropriate exhaust gas supply line or lines allows extremely fine adjustment of the temperature of the catalytic converter, especially the $NO_x$ storage catalytic converter, to an optimum operating temperature over a relatively broad engine operating range. Here again, it is possible to differentiate between the exhaust gas supply lines that have the function of a heat-conveying line or of a heat exchanger.

The exhaust gas supply line that is designed as a heat-conducting line is advantageously arranged coaxially with respect to the axis of rotation of the switching element. In accordance with this embodiment of the invention, the device contains a heat-conveying line that is arranged coaxially with respect to the axis of rotation of the switching element and with respect to a corresponding hole in the switching element. Rotation of the switching element thus causes no adjustment of the flow cross section of the heat-conveying line, but rather only of the flow cross sections of the outer exhaust gas supply lines that are designed as heat exchangers. Consequently, in this embodiment of the invention, the heat-conveying line is always in an open state, whereas the exhaust gas supply line or lines that are designed as heat exchangers may be opened, closed, or possibly partially closed (with respect to the supply of exhaust gases to the catalytic converter) by adjustment of the switching element.

In accordance with an alternative embodiment of the invention, the exhuast gas supply line that is designed as a heat-conveying line is positioned a certain radial distance from the axis of rotation of the switching element. In this embodiment of the invention, the flow cross sections of both the heat-conveying line and the line designed as a heat exchanger, which is positioned towards the outside, are changed, because all of the holes in the switching element are spaced a certain radial distance from the axis of rotation. Therefore, rotation of the switching element causes relative movement of all of the holes with respect to the corresponding openings of the exhaust gas supply lines (heat-conveying line and heat exchanger).

The switching element advantageously has a central disk and an outer ring that is coaxial with the disk and can be rotated relative to the disk. The disk is provided with holes corresponding to the exhaust gas supply lines that are designed as heat-conveying lines, and the ring is provided with holes corresponding to the exhaust gas supply lines that are designed as heat exchangers. In this way, it is possible for the disk and the ring to be controlled independently of each other to control the corresponding flow cross sections of the corresponding exhaust gas supply lines (heat-conveying line, heat exchanger), so that the desired operating temperature of the catalytic converter can be adjusted with great precision.

The switching element designed as a disk is preferably located upstream of the catalytic converter directly in front of its inlet. This makes it possible to achieve a constructionally relatively simple design of the device, since at least the exhaust gas supply line or lines that are designed as heat exchangers are in active contact with the corresponding holes in the switching element on only one side (inlet side with respect to the switching element).

BRIEF DESCRIPTION OF THE DRAWING

Several preferred embodiments of the invention will now be described with reference to the drawings.

DETAILED DESCRIPTION OF THE PREFERRED EMBODIMENT

Figure 1:
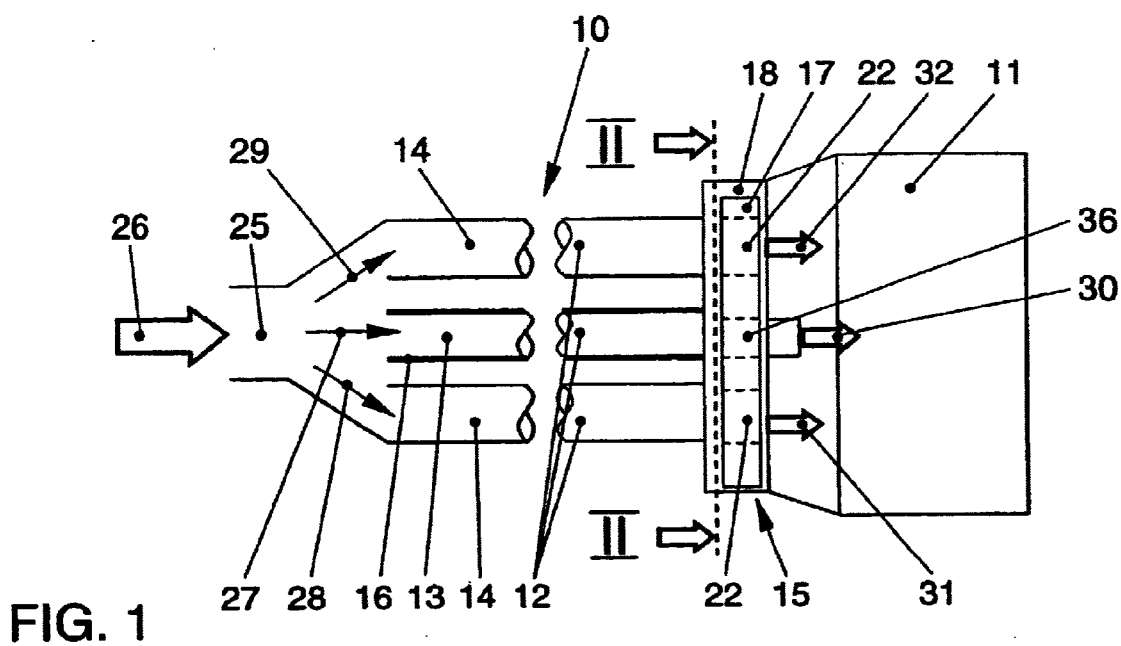
FIG. 1 shows a schematic partial side view of an exhaust gas supply device connected with the catalytic converter.

FIG. 1 shows a device 10 for supplying exhaust gases from an internal combustion engine of a vehicle (not shown) to a catalytic converter 11, especially an $NO_x$ storage catalytic converter. The device 10 contains several exhaust gas supply lines 12, which are joined by a common exhaust pipe 25 at their inlet end and run to the catalytic converter 11 at their outlet end after passing through an intermediate switchable control mechanism 15. The exhaust gas supply lines 12 are designed as separate pipes that are spaced a certain distance from one another and are arranged in the form of a bundle of pipes in such a way that an exhaust gas supply line 12 that is designed as a heat-conveying line 13 is located inside the bundle and is surrounded around its circumference by several exhaust gas supply lines 12 that are designed as heat exchangers 14. The exhaust gases are conveyed, as indicated by arrow 26, from the internal combustion engine (not shown), through the exhaust pipe 25, and to the individual exhaust gas supply lines 12, as indicated by arrows 27, 28, and 29. The exhaust gas supply lines 12 then convey the individual streams of exhaust gas to the catalytic converter 11 according to the switching state of the control mechanism 15, as indicated by arrows 30, 31, and 32. The exhaust gas supply line 12 that is designed as a heat-conveying line 13 serves the purpose of promoting the transfer of exhaust gas heat to the catalytic converter 11, while the exhaust gas supply lines 12 that are designed as heat exchangers 14 serve the purpose of promoting the extraction of exhaust gas heat upstream of the catalytic converter. The switchable control mechanism 15 is designed to vary the flow cross sections of the individual exhaust gas supply lines 12 that are designed as heat exchangers 14.

Figures 2, 3:
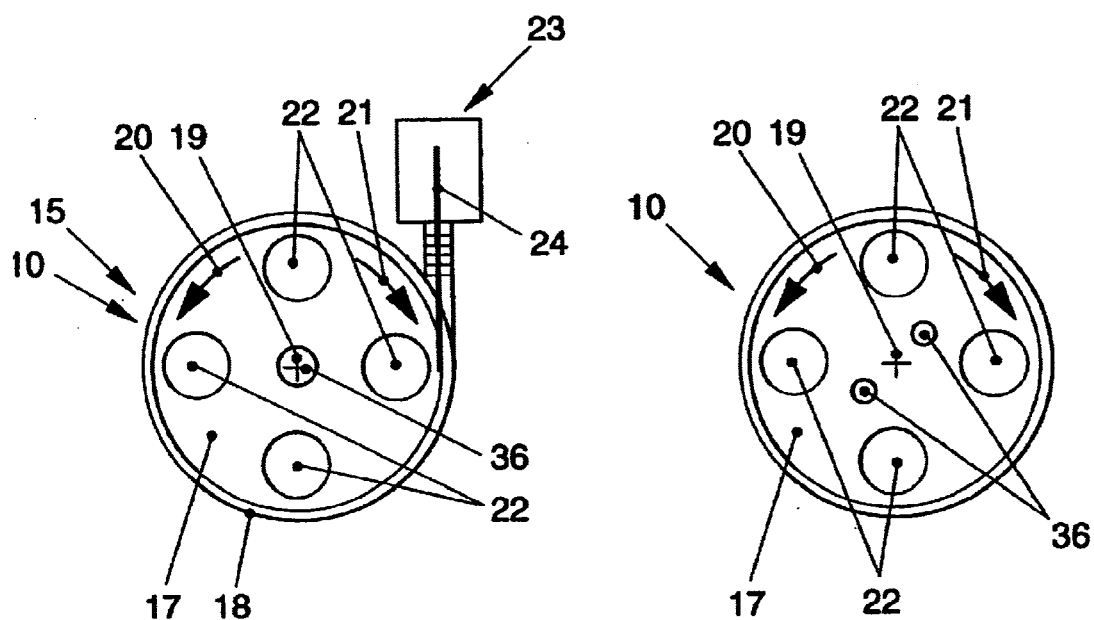
FIG. 2 shows a schematic front view along sectional line II—II of the device shown in FIG. 1.
FIG. 3 shows a schematic front view of an alternative embodiment of the device.

In accordance with FIG. 2, the control mechanism 15 has a switching element 17, which can be controlled by means of a control element 23 as a function of various parameters. The switching element 17 is designed as a disk that can be rotated in a housing 18 about an axis of rotation 19, as indicated by arrows 20 and 21. The disk is provided with holes 22, 36 that correspond to the arrangement of the exhaust gas supply lines 12 in a bundle of pipes. In this regard, in a specific switch position of the control mechanism 15 or of the rotatable switching element 17, the holes 22 are aligned with respect to the exhaust gas supply lines 12 that are designed as heat exchangers 14 (see also FIG. 1). In the embodiment shown in FIGS. 1 and 2, the opening 36 is aligned with respect to the exhaust gas supply line 12 that is designed as a heat-conveying line 13, independently of the switch position of the control mechanism 15 or of the switching element 17.

As FIGS. 1 and 2 show, the exhaust gas supply line 12 that is designed as a heat-conveying line 13 has a smaller flow cross section than the exhaust gas supply lines 12 that are designed as heat exchangers 14. In this way, comparatively little exhaust gas heat is transferred to the surrounding environment from the heat-conveying line 13 (small heat-transfer surface of heat-conveying line 13). On the other hand, the exhaust gas supply lines 12 that are designed as heat exchangers 14 are provided with the largest possible heat-transfer surface in order to promote effective heat transfer to the surrounding environment. In addition, the exhaust gas supply line 12 that is designed as a heat-conveying line 13 is provided with thermal insulation 16

(see FIG. 1) to allow as much exhaust gas heat as possible to be transferred to the catalytic converter 11. The heat-conveying line 13 preferably extends into the catalytic converter 11 to a point just upstream of the catalytic'support body (not shown) in order to allow the fastest possible heating of a locally limited region of the catalytic support material.

Figure 4:
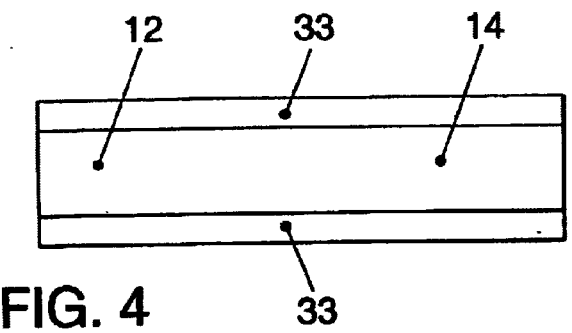
FIGS. 4, 6, 8, 10, and 12 show schematic side views of various embodiments of an exhaust gas supply line designed as a heat exchanger.
Figure 5:
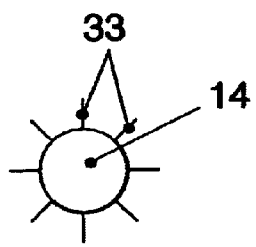
FIGS. 5, 7, 9, 11, and 13 show schematic front views of the exhaust gas supply lines shown in FIGS. 4, 6, 8, 10, and 12.
Figure 6:
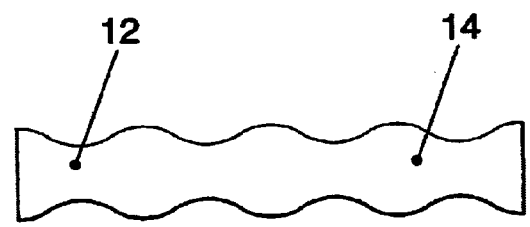
Figure 7:
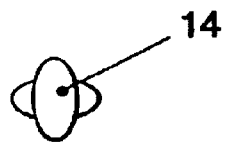
Figure 8:
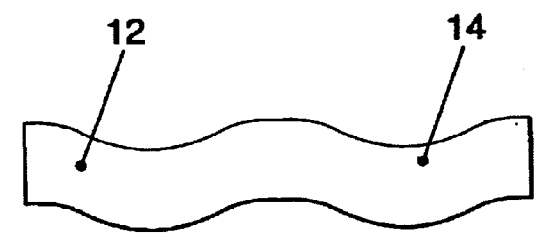
Figure 9:
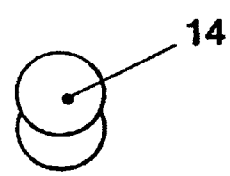
Figure 10:
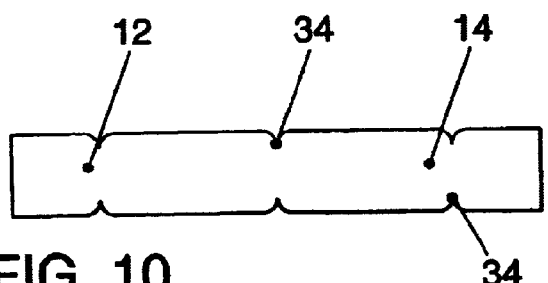
Figure 11:
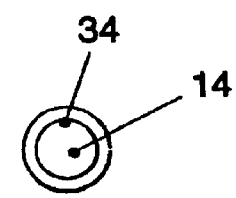
Figure 12:
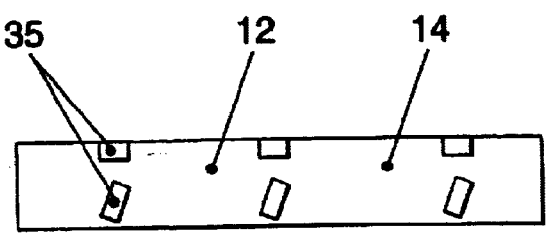
Figure 13:
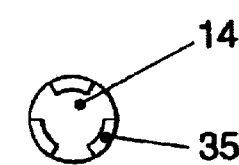

The walls of exhaust gas supply lines 12 that are designed as heat exchangers 14 are preferably configured in such a way that the heat-transfer surface is increased and/or turbulence is produced in the stream of exhaust gas (arrows 28, 29 in FIG. 1) in the given exhaust gas supply line 12. FIGS. 4 to 13 show various possibilities for this type of configuration. FIGS. 4 and 5 show an exhaust gas supply line 12 that is designed as a heat exchanger 14. It has outwardly projecting fins 33 that are uniformly distributed on the outside circumference. The fins 33 increase the heat-transfer surface area of the exhaust gas supply line 12 and thus improve heat transfer to the surrounding environment. FIGS. 6 and 7 show an exhaust gas supply line 12 that is designed as a heat exchanger 14, which has variable longitudinal ovalness. This increases the surface area and produces turbulence in the stream of exhaust gas in the exhaust gas supply line 12. FIGS. 8 and 9 show an exhaust gas supply line 12 with a wavelike shape in the longitudinal direction. This configuration also increases the surface area and produces turbulence in the stream of exhaust gas in the exhaust gas supply line 12. The exhaust gas supply line 12 shown in FIGS. 10 and 11 is provided with circumferential indentations 34, which increase the heat-transfer surface and also produce turbulence in the stream of exhaust gas flowing through the line. FIGS. 12 and 13 show an exhaust gas supply line 12, the inside walls of which are provided with beads 35, which may also be obliquely arranged in the direction of flow. The beads 35 serve the purpose of producing turbulence in the stream of exhaust gas in the exhaust gas supply line 12 and at the same time increase the heat-transfer surface of the exhaust gas supply line 12. In accordance with another embodiment of the invention that is not shown here, the exhaust gas supply lines 12 that are designed as heat exchangers 14 may also be designed as square, triangular, semicylindrical, or semioval pipes to increase the turbulence in the cross section. In this connection, the production of turbulence in the exhaust gas supply lines 12 that are designed as heat exchangers 14 is intended especially to increase heat transfer from the hot exhaust gas to the outer walls of the exhaust gas supply lines 12. Furthermore, the production of turbulence in the exhaust gas in the exhaust gas supply line 12 prevents the development of thermal stratification as the exhaust gas passes along the length of the line, i.e., the formation of an outer flow of cold exhaust gas and an inner flow of hot exhaust gas.

In accordance with another embodiment of the invention that is not shown here, the exhaust gas supply lines that are designed as heat exchangers 14 may be provided with a coating that promotes the dissipation of heat, and/or the outer, possibly specially configured, surface may be acted on by an outside airflow that promotes heat loss.

The device 10 shown in FIGS. 1 and 2 operates by the following principle: During a cold start of the internal combustion engine or during an engine warmup phase, i.e., a phase in which the catalyst has not yet reached the catalytic ignition point, the control mechanism 15 is switched in such a way that, by means of suitable rotation of the switching element 17 about the axis of rotation 19, the flow of exhaust gas through the exhaust gas supply lines 12 that are designed as heat exchangers 14 is completely or at least partially obstructed. In this position of the switching element 17, the holes 22 are thus no longer aligned with respect to the exhaust gas supply lines 12 that are designed as heat exchangers 14. The inner, heat-conveying line 13 remains open even in this position of the switching element 17, since it is arranged coaxially with the axis of rotation 19 of the switching element 17. In this switch position, hot exhaust gas is conveyed through the heat-conveying line 13, as indicated by arrows 26, 27, and into the catalytic converter 11, as indicated by arrow 30. When the catalyst 11 has reached the catalytic ignition point, the switching element 17 is rotated about the axis of rotation 19 by the control element 23, as indicated by arrow 20 or 21, until the holes 22 align with the corresponding exhaust gas supply lines 12 that are designed as heat exchangers 14. In this switch position, hot exhaust gas is conveyed into the heat exchanger 14, as indicated by arrows 26, 28, 29, in which it is cooled and then further conveyed as a cold partial stream of exhaust gas to the catalytic converter 11, as indicated by arrows 31, 32. The stream of exhaust gas, which is hot at the inlet end (arrow 26), is thus converted at the outlet end into a partial stream of hot exhaust gas (arrow 30) and several partial streams of cold exhaust gas (arrows 31, 32). The parameter-dependent switching of the control mechanism 15 ensures that the catalyst 11 reaches its catalytic ignition point as fast as possible in order to achieve correct nitrogen oxide conversion without any very great lag time, and that the catalyst 11, after it has reached the catalytic ignition point, does not exceed an upper temperature limit of a well-defined window of exhaust gas temperatures at higher engine loads, within which correct and effective conversion of nitrogen oxide by the catalyst 11 can occur.

Switching parameters that are especially suitable are the engine coolant temperature, the exhaust gas temperature upsteam and/or downstream of the catalytic converter with respect to the direction of exhaust gas flow, the catalytic converter temperature, and/or the exhaust gas mass flow. Since, at high exhaust gas mass flows, unacceptably high exhaust gas back pressures can develop even during the catalyst heating phase, the exhaust gas supply lines 12 that are designed as heat exchangers 14 must be partially or completely opened by suitable switching of the control mechanism 15 even at catalyst temperatures below the catalytic ignition point.

The switching element 17 is preferably adjustable to infinitely many intermediate positions. Extremely precise and variable adjustment of the operating temperature of the catalytic converter 11 can be achieved by continuously variable opening of the flow cross sections of the exhaust gas supply lines 12 that are designed as heat exchangers 14 as a function of the switching parameters specified above. In particular, at high mass flows during the catalyst heatup phase, it is possible to prevent the cooling capacity of the system from rising too sharply due to complete opening of the exhaust gas supply lines 12 that are designed as heat exchangers 14, which would prevent the catalyst from quickly reaching its ignition point. Of course, it is also conceivable for the switching element 17 to be controlled by a two-position switching system. With a two-position switch, the appropriate exhaust gas supply lines 12 are completely opened or completely closed by switching the control mechanism 15.

FIG. 3 shows an alternative embodiment of the invention with respect to the number and arrangement of the heat-conveying lines 13. In this embodiment, the switching element 17 is provided with two separate holes 36 that are spaced some distance apart. The holes 36 are positioned a certain radial distance apart relative to the axis of rotation 19 of the switching element 17. The device 10 has two corresponding heat-conveying lines 13 (not shown in the drawings). In this type of arrangement of the holes 36 and of the corresponding heat-conveying lines 13, rotation of the switching element 17 about the axis of rotation 19 controls the flow cross sections of both the exhaust gas supply lines 12 that are designed as heat exchangers 14 and those that are designed as heat-conveying lines 13. This increases the cooling capacity of the device 10, since it now becomes possible to vary the flow cross sections of the inner, heat-conveying lines 13 by switching the control mechanism 15. The number of exhaust gas supply lines 12 designed as heat exchangers 14 and as heat-conveying lines 13 and their flow cross sections can be adapted to the specific application.

In accordance with another alternative embodiment of the invention that is not shown here, the switching element 17 has a central disk and an outer ring that is coaxial with the disk and can be rotated relative to the disk, such that the disk is provided with holes 36 corresponding to the exhaust gas supply lines 12 that are designed as heat-conveying lines 13, and the ring is provided with holes 22 corresponding to the exhaust gas supply lines 12 that are designed as heat exchangers 14. This alternative embodiment allows independent adjustment of the flow cross sections of the exhaust gas supply lines 12 that are designed as heat-conveying lines 13, on the one hand, and of the exhaust gas supply lines 12 that are designed as heat exchangers 14, on the other hand. In the event that the catalytic converter 11 exceeds an established upper temperature limit, despite the fact that the exhaust gas supply lines 12 that are designed as heat exchangers 14 are open, the holes 36 can be partially or completely closed by adjusting the switching element 17. In this connection, the rotation of the central disk and the outer ring can be produced by two separate control elements or by a single, suitably designed control element.

In accordance with an alternative embodiment of the invention, the control element 23 may be designed as a vacuum box or as an electromagnetic control device, which has a winding, by means of which the switching element 17, which acts as the armature, can be caused to rotate.

The switching element 17 designed as a disk is positioned immediately upstream of the inlet of the catalytic converter 11.

If the exhaust gas temperature or the catalytic converter temperature falls below an established lower limit, the exhaust gas supply lines 12 that are designed as heat exchangers 14 can be partially or completely closed by suitable adjustment of the switching element 17 by the control element 23.

Instruments that are not shown but are already well known, together with a central control unit, can be used to determine and suitably process the values of the various switching parameters and possibly to initiate automatic switching of the control mechanism 15.

What is claimed is:

1. A device for supplying exhaust gases from an internal combustion engine to a catalytic converter, comprising: multiple exhaust gas supply lines including at least one exhaust gas supply line that serves as a heat-conveying line to promote a transfer of exhaust gas heat to the catalytic converter and at least one other exhaust gas supply line that serves as a heat exchanger to promote an extraction of heat from the exhaust gas upstream of the catalytic converter; and a switchable control mechanism operative to control a flow cross-section of at least one of the exhaust gas supply lines, the exhaust gas supply lines being arranged as a bundle of pipes including individual pipes which are spaced apart and extend to the catalytic converter so that the exhaust gas supply line that is the heat-conveying line is arranged as an inner pipe in the bundle and is surrounded around its circumference by the exhaust gas supply lines that are heat exchangers, which are spaced some distance from one another in a circumferential direction of the heat conveying line, the exhaust gas supply line that is the heat-conveying line having a cross-section that is smaller than a cross-section of the exhaust gas supply line that is the heat exchanger.

2. A device in accordance with claim 1, wherein the exhaust gas supply lines are configured as pipes that are separated from one another.

3. A device in accordance with claim 1, wherein the heat-conveying line is provided with thermal insulation.

4. A device in accordance with claim 1, wherein the heat-conveying line is arranged to extend into the catalytic converter to a point immediately upstream of a support body of the catalytic converter.

5. A device in accordance with claim 1, wherein the exhaust gas supply line that is a heat exchanger has a wall configured so that a at least one of a heat-transfer surface is increased and turbulence is produced in a stream of exhaust gas in the exhaust gas supply line.

6. A device in accordance with claim 1, wherein the exhaust gas supply line that is a heat exchanger is provided with a coating that promotes heat dissipation.

7. A device in accordance with claim 1, wherein the exhaust gas supply line that is a heat exchanger has an outer surface arranged to be actable upon by an outside airflow that promotes heat dissipation.

8. A device in accordance with claim 1, wherein the control mechanism includes a switching element and a control element operatively connected to the switching element so as to control the switching element as a function of various parameters.

9. A device in accordance with claim 8, wherein the switching element is a rotatable disk with holes that correspond to the individual pipes in the bundle of pipes.

10. A device in accordance with claim 8, wherein the control element is a control rod that is actuable by an electric servomotor.

11. A device in accordance with claim 8, wherein the control element is a vacuum box.

12. A device in accordance with claim 8, wherein the control element is an electromagnetic control device having a winding via which the switching element, which acts as an armature, is rotatable.

13. A device in accordance with claim 8, wherein the control mechanism is configured so that the switching element is adjustable as a two-position switch.

14. A device in accordance with claim 8, wherein the control mechanism is configured so that the switching element is adjustable to an infinite number of intermediate positions.

15. A device in accordance with claim 9, wherein the heat-conveying line is positioned coaxially with an axis of rotation of the switching element.

16. A device in accordance with claim 9, wherein the heat-conveying line is positioned a radial distance from an axis of rotation of the switching element.

17. A device in accordance with claim 8, wherein the switching element has a central disk and an outer ring that is coaxial with the central disk and is rotatable relative to the central disk, the central disk having holes that correspond to the exhaust gas supply lines that are heat-conveying lines, and the ring having holes that correspond to the exhaust gas supply lines that are heat exchangers.

18. A device in accordance with claim 9, wherein the switching element is positioned immediately upstream of an inlet of the catalytic converter.

\* \* \* \* \*